(12) United States Patent
Takahashi et al.

(10) Patent No.: US 7,280,322 B2
(45) Date of Patent: Oct. 9, 2007

(54) MAGNETIC SENSOR AND MAGNETIC HEAD WITH THE MAGNETIC SENSOR

(75) Inventors: Hiromasa Takahashi, Hachioji (JP); Jun Hayakawa, Sendai (JP)

(73) Assignee: Hitachi, Ltd., Tokyo (JP)

( * ) Notice: Subject to any disclaimer, the term of this patent is extended or adjusted under 35 U.S.C. 154(b) by 393 days.

(21) Appl. No.: 10/849,516

(22) Filed: May 20, 2004

(65) Prior Publication Data

US 2004/0257714 A1    Dec. 23, 2004

(30) Foreign Application Priority Data

May 22, 2003  (JP) .............................. 2003-144262

(51) Int. Cl.
*G11B 5/127*  (2006.01)
*G11B 5/33*   (2006.01)
(52) U.S. Cl. .................................... 360/324.1; 360/322
(58) Field of Classification Search ................. 360/322, 360/324.1
See application file for complete search history.

(56) References Cited

U.S. PATENT DOCUMENTS

| 6,020,738 | A | * | 2/2000 | Van Den Berg et al. ..... 324/252 |
| 6,124,711 | A | * | 9/2000 | Tanaka et al. ............... 324/252 |
| 6,128,160 | A | * | 10/2000 | Yamamoto ............. 360/324.11 |
| 6,185,077 | B1 | * | 2/2001 | Tong et al. ............. 360/324.11 |

FOREIGN PATENT DOCUMENTS

| JP | 03-154217 | 11/1989 |
| JP | 4-358310 | 11/1991 |
| JP | 7-221363 | 2/1994 |
| JP | 11-509956 | 5/1997 |
| JP | 2000-137906 | 4/1999 |
| JP | 2001-168414 | 12/1999 |
| JP | 2001-230471 | 11/2000 |

(Continued)

OTHER PUBLICATIONS

Jedema et al., "Electrical Detection of Spin Precession in a Metallic Mesoscopic Spin Valve", 2002 Macmillan Magazines Ltd., Letters to Nature, pp. 713-716.

(Continued)

*Primary Examiner*—Brian E. Miller
(74) *Attorney, Agent, or Firm*—Reed Smith LLP; Stanley P. Fisher, Esq.; Juan Carlos A. Marquez, Esq.

(57) ABSTRACT

Provided is a magnetic head having a magnetoresistive device which has high output and is best suited to high-recording-density magnetic recording/reading. A magnetic sensor having large output can be realized by providing a magnetic sensor which comprises: a first ferromagnetic film; a conductor which intersects the first ferromagnetic film via a first intermediate layer; a current circuit structure which is connected so as to cause a current to flow from the first ferromagnetic layer to the conductor; a second ferromagnetic film which is formed on the conductor in an intersecting manner via a second intermediate layer and which generates a signal of voltage changing according to a change in an external magnetic field; a voltage change amplifier film which contains materials whose resistance changes nonlinearly due to voltage; and an electrode which is connected to the voltage change amplifier film.

8 Claims, 11 Drawing Sheets

FOREIGN PATENT DOCUMENTS

| | | |
|---|---|---|
| JP | 2002-190630 | 8/2001 |
| WO | WO97/44781 | 5/1997 |

OTHER PUBLICATIONS

C. Heide, "Effects of Spin Accumulation in Magnetic Multilayers", 2001 The American Physical Society, Physical Review B, vol. 65, 05441, 17 pages.

Liu et al., "Electric-Pulse-Induced Reversible Resistance Change Effect in Magnetoresistive Films", 2000 American Institute of Physics, Applied Physics Letters, vol. 76, No. 19, pp. 2749-2751.

Brataas, Arna, et al., "Spin accumulation in small ferromagnetic double-barrier junctions", Physical Review B, vol. 59, No. 1, Jan. 1, 1999, pp. 93-96.

* cited by examiner

READER STRUCTURE (PLAN VIEW)

A-A' CROSS SECTION

B-B' CROSS SECTION

MAGNETIC SENSOR AND MAGNETIC HEAD WITH THE MAGNETIC SENSOR

CLAIM OF PRIORITY

The present application claims priority from Japanese application JP 2003-144262 filed on May 22, 2003, the content of which is hereby incorporated by reference into this application.

BACKGROUND OF THE INVENTION

1. Field of the Invention

The present invention relates to a magnetic sensor, a magnetic head and a magnetic recording/reading apparatus.

2. Background Art

In the field of magnetic recording/reading apparatus, an increase in recording density at an almost 100% annual rate is required. Also a magnetic recording/reading head provided in this magnetic recording/reading apparatus is required to provide higher performance in the two characteristics of recording and reading.

For a magnetic recording/reading head, it is important to solve the three technical problems of (1) an improvement of techniques for increasing sensitivity, (2) an improvement of techniques for narrowing the track width, and (3) techniques for narrowing the read gap distance.

For the problem (1) above, this high recording density design has been coped with by using the anisotropic magnetoresistive (AMR) effect for recording densities of 1 to 10 (Gb/in.$^2$), the giant magnetoresistive (GMR) effect, which ensures higher sensitivity, for high recording densities of 10 to 30 (Gb/in.$^2$), and the advanced GMR effect called a specular GMR effect or a nano-oxide layer GMR effect aimed at an increase in output by the multi-reflection effect of electron spins, in which a (mirror reflection) insulator oxide layer of high electron reflectivity and the like are sandwiched between interlayers of a GMR structure, for recording densities of 20 to 70 (Gb/in.$^2$).

For a magnetic head using the GMR effect, a structure called a spin-valve is disclosed in the JP Patent Publication (Kokai) No. 4-358310 (Literature 1). This magnetic head is constituted by a pinned layer formed from a magnetic layer whose magnetization is pinned by an antiferromagnetic layer in a specific direction, a nonmagnetic thin film laminated in this pinned layer, and a free layer formed from a ferromagnetic layer laminated via this nonmagnetic thin film, and has a magnetoresistive device whose electrical resistance changes according to a relative angle of magnetization of the pinned layer and the free layer.

Furthermore, in the JP Patent Publication (Kokai) No. 2000-137906 (Literature 2), the JP Patent Publication (Kokai) No. 2001-168414 (Literature 3) and the JP Patent Publication (Kokai) No. 2001-230471 (Literature 4) is described a structure with an improved MR (magnetoresistive) ratio in a CIP-GMR (current-in-plane GMR) element, in which an oxide layer is inserted into at least either of the free layer side and the pinned layer side and a multi-reflection of electrons is generated by utilizing the mirror reflection of the oxide, thereby to improve the magnetoresistive ratio. In the JP Patent Publication (Kokai) No. 2002-190630 (Literature 5) there is also shown a CIP-GMR structure in which a half-metal layer is interposed between a free layer and an intermediate layer or between an intermediate layer and a pinned layer.

At present, a higher reading method is required due to further progress in high sensitivity design. At 70 to 150 (Gb/in.$^2$), the tunneling magnetoresistive (TMR) effect with a very high MR ratio is effective from the standpoint of an improvement of sensitivity. And it might be thought that for ultrahigh recording densities exceeding 150 (Gb/in.$^2$), the GMR (CPP-GMR) effect and the like of a method which involves causing a detection current to flow in a direction perpendicular to the film surface become mainstream by making the most of the advantage that the device impedance is small. TMR is released to the public as a basic technique in the JP Patent Publication (Kokai) No. 3-154217 (Literature 6) and also in the JP Patent Publication (Kokai) No. 10-91925 (Literature 7) etc.

In the case of CIP-GMR, the insulation between a device and a shield poses a problem when the shield gap distance is shortened to cope with high track recording density design. In contrast to this, in the case of CPP-GMR, the insulation characteristics do not pose an important problem and the effects of a thermal device breakdown by static voltage and current and a change to nonlinearity by a magnetic field seem to be small. Although many CPP-GMR structures have been reported, representative ones are described in the JP Patent Publication (Kohyo) No. 11-509956 (Literature 7) and the JP Patent Publication (Kokai) No. 7-221363 (Literature 8).

[Literature 9] Electrical detection of spin precession in a metallic mesoscopic spin valve, F. J. Jedema et al., NATURE, VOL 416, pp 713-716, 18 Apr. 2002

[Literature 10] Physical Review B, VOLUME 59, NUMBER 1, pp 93-96

[Literature 11] Physical Review B, VOLUME 65, 054401, pp 1-17

[Literature 12] S. Q. Liu et al., APPLIED PHYSICS LETTERS, VOLUME 76, NUMBER 19 (2000), pp 2749-2751

SUMMARY OF THE INVENTION

When the structures of magnetic reading devices in the future are considered, high-sensitivity magnetoresistive sensors of CPP-GMR (current-perpendicular-to-plane GMR), TMR (tunneling magnetoresistive effect), etc. in which the direction of current flow is the film thickness direction are promising. Because the basic structure of these magnetoresistive sensors resides in that the magnetic sensors utilize a structure in which a sensing current perpendicular to the film surface is caused to flow, it might be thought that in the future, the structures of magnetic reading devices will make a shift to a structure in which a sensing current is caused to flow by the CPP method.

A TMR device is composed of a pair of magnetic layers which sandwich an insulating barrier and constructed so as to cause a sensing current to flow in the film thickness direction of the magnetic materials. Because electrical conduction occurs via an insulating barrier layer, resistance is high and when a TMR device is used in a reading head or a magnetic field sensor, various noises are generated, resulting in a decrease in the signal versus noise (S/N) property. To cope with this, studies on low resistance design are actively carried out. In a barrier film using $Al_2O_3$ which is at present most commonly adopted, a decrease in output associated with a reduced film thickness aimed at lowering resistance is undeniable and great progress is not made in low resistance design. Although a search for new materials has advanced, a solution to the big problem that when the device area decreases, device resistance increases in proportion to the device area has not yet been obtained.

In contrast to this, in the CPP-GMR, the sensor portion has a GMR structure and conductance occurs in the film thickness direction of a thin film. Because of a shorter current path compared with the CIP-GMR, the resistance which occurs when a conventional GMR film is applied is 0.4 to 2.0 mΩ or so in the case of a device having an area of 0.25 µm$^2$ and ΔR/R is 20% at most. Because ΔR is 0.3 to 1.2 mΩ, these values are too small in comparison with an output value of not less than 2 Ω, which value is necessary for the application to a magnetic reader device.

Furthermore, in a conventional GMR film, the magnetoresistive ratio in the CPP direction is about several percent. Although by reducing the size of a device, resistance R can be raised and ΔR can be increased, at present the making of a device area of about 0.1 µm$^2$ is the limit. As techniques for reducing the size of a device, lithograph using the technology of atomic force microscopy, electron beam lithography and the like are conceivable, it is one of the difficult techniques to make a device of less than 0.1×0.1 µm$^2$.

When a reading head of not less than 500 Gb/in.$^2$ is considered, it can be thought that the device area decreases. Therefore, a material which has resistivity which is small to a certain degree and provides a large GMR output is demanded. Although it is conceivable to use half-metal directly in a magnetic layer as such a material, the development of half-metal from the standpoint of material engineering requires time and, therefore, it is feared that requirements in terms of time could not be met. Accordingly, techniques for solving these problems by introducing a structure which is new in terms of device structure are needed.

Recent years have seen vigorous studies and device development related to the interaction of currents with polarized spins.

For example, as described in NATURE (Electrical detection of spin precession in a metallic mesoscopic spin valve, F. J. Jedema et al., NATURE, VOL 416, pp 713-716, 18 Apr. 2002) (Literature 9), the phenomenon that a spin current which is polarized with a spin polarizability conducts over a long distance of not less than 100 nm, generating a magnetic interaction, has been actually verified.

These researchers made differently sized fine Co wires and fine Al wires which interest these fine Co wires and a structure in which alumina barrier layers are provided in places where the fine Co wires and the fine Al wires intersect each other. According to this phenomenon, when a current was caused to flow from a Co wire of a large size to an Al wire and a magnetic field was applied to a film, a voltage change which depends on a magnetic field occurred between the other Co wire through which no current flows and an Al wire. And a magnetic interaction was verified in spite of a wide gap between the wires exceeding 500 nm.

This is due to the effect of the accumulation of spin polarized electrons in the interface portion of the fine Al wire, which is called spin accumulation, and it has been theoretically understood by a form represented, for example, by Physical Review B, VOLUME 59, NUMBER 1, pp 93-97 (G. E. W. Bauer et al.) (Literature 10) and Physical Review B, VOLUME 65, 054401, pp 1-17 (C. Heide) (Literature 11) that this effect occurs due to the distribution of accumulated spin polarized electrons in a wide region of a fine wire.

Generally speaking, this device has such characteristics that if there are two magnetic layers having different coercive forces with respect to an external magnetic field, a voltage change with respect to a conductor of one of the magnetic layers occurs as an output and that this voltage has different polarities in a case where the magnetization of the two magnetic layers is parallel and in a case where the magnetization of the two magnetic layers is anti-parallel. In the above-described structure, the magnetic layers are simple Co and this Co is connected by Al. Even in this structure, an output associated with a change in a magnetic field at room temperature is obtained. With is structure, however, the ratio ΔV/V of an output is about 1% at most and small.

Accordingly, the present invention was proposed in view of such prior art and has as its object the provision of a large-output magnetic sensor effective in increasing resolution and a magnetic head provided with this sensor.

To achieve the above object, a magnetic sensor and a magnetic head related to the present invention each comprise a first ferromagnetic film; a conductor which intersects the first ferromagnetic film via a first intermediate layer; a current circuit structure which is connected so as to cause a current to flow from the first ferromagnetic layer to the conductor; a second ferromagnetic film which is formed on the conductor in an intersecting manner via a second intermediate layer and which generates a signal of voltage changing according to a change in an external magnetic field; a voltage change amplifier film which contains materials whose resistance changes nonlinearly due to voltage; and an electrode which is connected to the voltage change amplifier film. The above-described voltage change amplifier film contains materials whose resistance changes nonlinearly due to voltage and converts the signal of voltage changing to a change in electrical resistance and amplifies the signal intensity of the change in electrical resistance.

In order to obtain a high-output reading sensor, it is important to (1) increase voltage changes from the standpoint of material constitution and (2) amplify these voltage changes by a device structure.

For (1) above, (A) it is important to apply a material of high spin polarizability as the material for the magnetic layers. (B) For the material for the conductor, it is important to use Al and Cu and furthermore materials having a longer mean free path of spin electrons than these or materials having the function of a d electron conductor.

For (2) above, a structure which converts, for example, a voltage change ΔV obtained from the above-described structure to a great change in a physical quantity by some method is necessary. The present inventors found that a mechanism which converts an output of the above-described device to a large signal of resistance change by using materials whose electrical resistance changes nonlinearly when a magnetic field or a voltage is applied to the materials is effective as such a method.

Because the above-described output signal by a magnetic sensor which uses spin electrons is a bipolar output in which the polarity of voltage is reversed by the direction of magnetization of a magnetic material, by inputting this output in a device which changes voltage to a resistance change as described above, it becomes possible to obtain a large resistance change as a signal.

By using such means it becomes possible to provide a magnetic sensor of a new structure which has a larger output than before and a magnetic reading head provided with this magnetic sensor.

DETAILED DESCRIPTION OF THE PREFERRED EMBODIMENTS

Magnetic heads suitable for the application of the present invention will be described in detail below.

Figure 1:
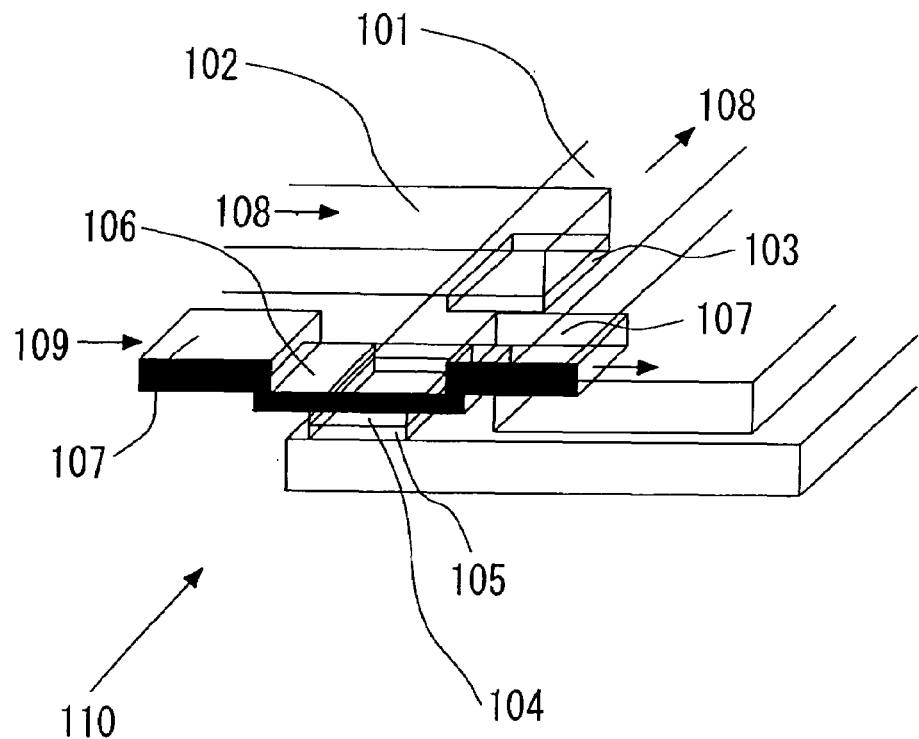
FIG. 1 is a schematic view showing the structure of a magnetic reading head device of the present invention.

In a magnetic head to which the present invention is applied, a linear conductor 101 as shown in FIG. 1 and a first magnetic layer 102 are in contact with each other at a first intermediate layer 103 formed on this conductor, and a second magnetic layer 104 is in contact with this conductor 101 via an intermediate layer 105 in another place of the conductor 101. Furthermore, this second magnetic layer 104 is in contact with a voltage change amplifier film 106 and electrodes 107 are disposed at both ends of the voltage change amplifier film 106.

A current source is connected to the first magnetic layer 102 and the conductor 101 so that a current is caused to flow from the direction 109 to the direction 110. An end of the conductor which extends in the direction 112 is electrically grounded.

The film 106 having the function that resistance changes nonlinearly due to voltage (hereinafter referred to as the voltage change amplifier film) has a mechanism of causing a current for detecting output signals via the electrodes 107 to flow, for example, in the direction 108.

Although the electrodes 107 are described as the two-probe method in terms of a circuit, circuit configurations for both of measurement made by use of the four-probe method and measurement made by use of the two-probe method are possible as apparatus configurations. Furthermore, it is possible to increase the final output by bringing an electrically grounded film into contact with the other main face side of the voltage change amplifier film 106 directly or via a high-resistance film.

This conductor 101 is formed from a nonmagnetic conductive metal selected from the group consisting of Cu, Au, Ag, Pt, Al, Pd, Ru, Ir and Rh or a conductive compound which contains GaAs, Si, TiN, TiO and $ReO_3$ as main components.

The material which constitutes the first and second magnetic films 102, 104 is formed from an element selected from the group consisting of Co, Ni, Fe and Mn or an alloy or a compound which contains at least one kind of these elements as main components. Furthermore, the present invention applies also to cases where these ferromagnetic layers contain material which contain oxides having the structure of $AB_2O_4$ represented by the half-metal $Fe_3O_4$ in which A is at least one kind selected from the group consisting of Fe, Co and Zn and B is an oxide containing one kind selected from the group consisting of Fe, Co, Ni, Mn and Zn, compounds in which at least one kind selected from the group consisting of the transition metal elements Fe, Co, Ni, Cr and Mn is added to $CrO_2$, CrAs, CrSb or ZnO, compounds in which Mn is added to GaN, or Heusler alloys of $C_2D_xE_{1-x}F$ type represented by $Co_2MnGe$, $Co_2MnSb$, $Co_2Cr_{0.6}Fe_{0.4}Al$ and the like in which C is one kind selected from the group consisting of Co, Cu and Ni, D and E are each one kind selected from the group consisting of Mn, Fe and Cr, and F is at least one kind selected from the group consisting of Al, Sb, Ge, Si, Ga and Sn.

Furthermore, the first and second intermediate layers 103, 105 are each a single film or a laminated film which is formed from a material containing at lest one kind selected from the group consisting of $Al_2O_3$, AlN, $SiO_2$, $HfO_2$, $Zr_2O_3$, $Cr_2O_3$, MgO, $TiO_2$ and $SrTiO_3$.

Now the behavior of the structures of the present invention and the mechanism of producing effects will be described here. The present invention is constituted by the magnetoresistive device using the accumulation effect of spin currents and the voltage change amplifier film.

The magnetoresistive device using the accumulation effect outputs a signal of voltage changing according to a magnetic field change signal given by a recording medium.

The voltage change amplifier film is formed from materials whose resistance is greatly changed by voltage and electrical field. And this voltage change amplifier film has the mechanism of converting a signal of voltage changing, which has been applied by the magnetoresistive device, to a resistance change and outputting the converted signal.

Part of materials of oxides having the Perovskite structure are receiving attention as one of the materials for the voltage change amplifier film. Although in this material system, materials exhibiting the properties of CMR (colossal magnetoresistance) and superconductivity have hitherto been widely known, completely different properties have been known for materials which are composed of the same components and have different component ratios.

For example, as described in APPLIED PHYSICS LETTERS, VOLUME 76, NUMBER 19 (2000), pp 2749-2751 (S. Q. Liu et al.) (Literature 12), it is reported that in the material $Pr_{0.7}Ca_{0.3}MnO_3$, resistance at room temperature changes by not less than 1700% by the application of pulse electrical fields having different polarities.

It might be thought that materials of oxides having the Perovskite structure provide an industrially important function because changes in the properties are less apt to occur and they can be easily fabricated by relatively easy fabrication techniques such as spreading. YBaCuO-based materials and $LaCaMnO_3$-based and $LaBaMnO_3$-based materials are also known as such materials. It might be thought that carrier electrons which are enhanced by an electric field to the Fermi energy level of the materials are doped to increase conductivity, thereby serving an important function in this phenomenon.

In the present invention, a film which generates such a nonlinear resistance change is called the voltage change amplifier film.

Figure 2:
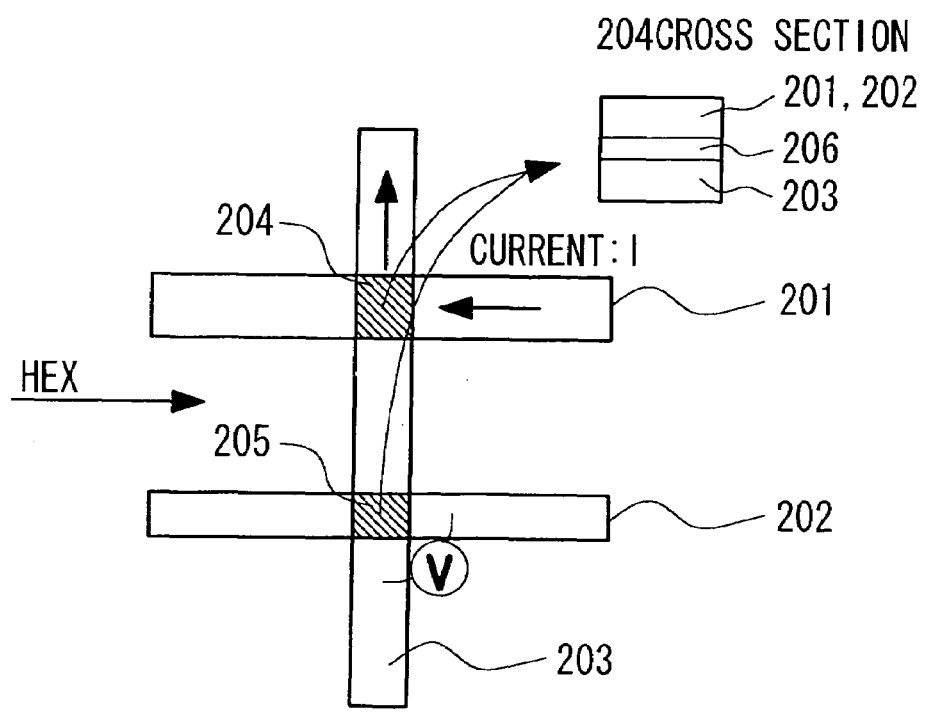
FIG. 2 is a schematic view showing the basic structure of a magnetoresistive device portion of the present invention.

The magnetoresistive device using the accumulation effect of spin currents has a basic structure as shown in FIG. 2. Two fine Co wires 201, 202 having different wire widths are disposed in parallel to each other, and a fine Cu wire 203 which intersect these fine Co wires 201, 202 are jointed to the respective Co wires in areas 204, 205. Therefore, the joints of the two are formed by an $Al_2O_3$ thin film having a film thickness of 1.2 nm, for example.

By causing a current to flow from the fine Co wire 201 to the fine Cu wire 203, a magnetic field H is applied to the whole device. At this time, because of the difference in line width the fine Co wires have different coercive forces and as shown in FIG. 3(A), the magnetic layer 1 (201) and the magnetic layer 2 (202) have different shapes of magnetization curve.

Figure 3:
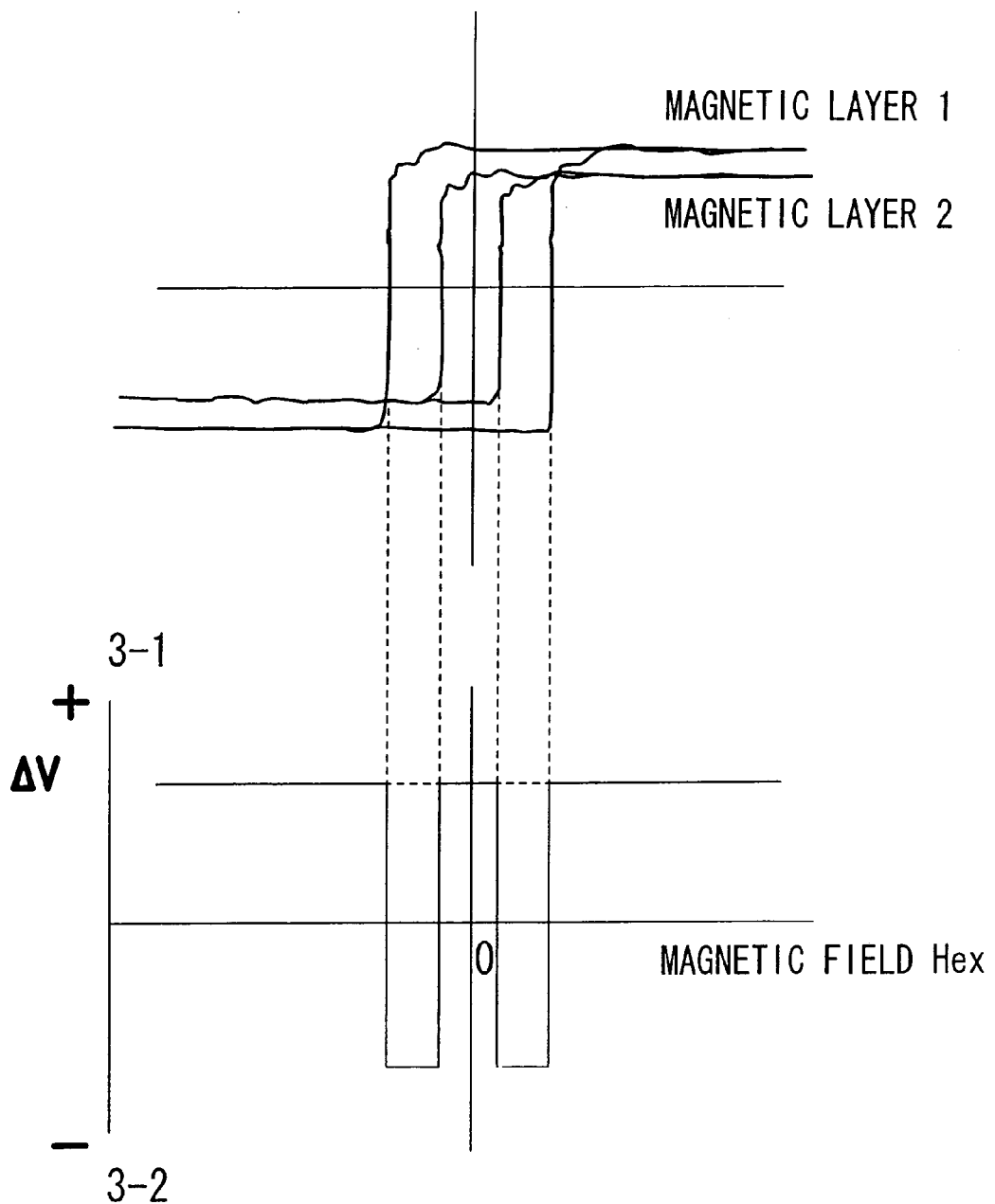
FIG. 3 is a graph showing the magnetization curves of a magnetoresistive device portion of the present invention and a graph showing the magnetic properties and magnetic field changes of an output of a signal of voltage changing.

The measurement of a voltage change ΔV which occurs between the fine Co wire 202 and the fine Cu wire 203 in the joint area 205 reveals that as shown in FIG. 3(B), the voltage change V reverses the polarity when the magnetization caused by the difference in coercive force is in an anti-parallel condition. This change can be ascertained at room temperature even when the distance between the fine Co wires 201, 202 is as wide as about 500 nm. The magnitude of this magnetoresistive ratio ΔV/V is about 1% at room temperature.

In the prior art, the spin information which is provided by a current flowing through a metal attenuates to zero at a distance of 100 nm at most.

In the present prevention, however, a magnetoresistive interaction occurs in an area where the spin information shows a distance exceeding 500 nm. This is due to the phenomenon that when a current is caused to flow through an interface between a magnetic layer and a nonmagnetic layer, spin accumulation occurs in which spin polarized currents generate retention near the interface and accumulate in a wide area within the nonmagnetic layer. Therefore, it is possible to constitute a magnetic sensor by causing the above-described fine Co wires 201 and 202 to perform a magnetic action as in a pinned layer of a usual spin-valve layer and a free layer, respectively.

That is, the magnetic sensor is constructed in such a manner that the magnetization of one of the two magnetic layers is pinned in a specific direction and the magnetization of the other magnetic layers is reversed by an external magnetic field, with the result that a case where the magnetization direction of both is parallel and a case where the magnetization direction of both is anti-parallel are realized, whereby the ferromagnetic film on the side where magnetization is pinned acts as a pinned later in the spin-valve structure and the other ferromagnetic film acts as a free layer.

In actuality, it is possible to realize the ferromagnetic film in the above-described structure on the side where magnetization is pinned by pinning magnetization by use of an exchange bond by the unidirectional anisotropy of an antiferromagnetic layer or adjusting the film thickness and material quality so that a larger coercive force than on the magnetic layer on the free layer side is obtained.

Figure 4A:
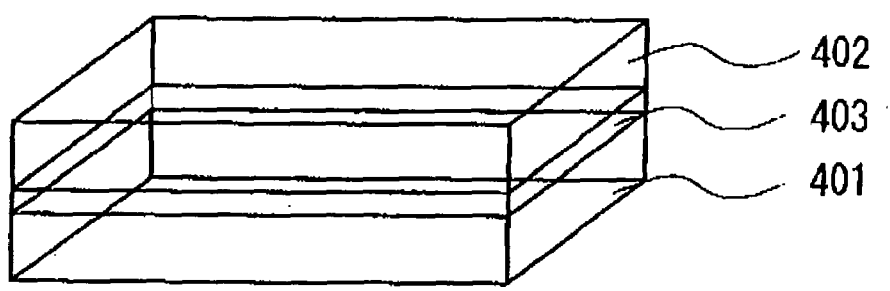
FIG. 4(A) is an explanatory drawing of a method of magnetization pinning of a first ferromagnetic layer of the present invention.
Figure 4B:
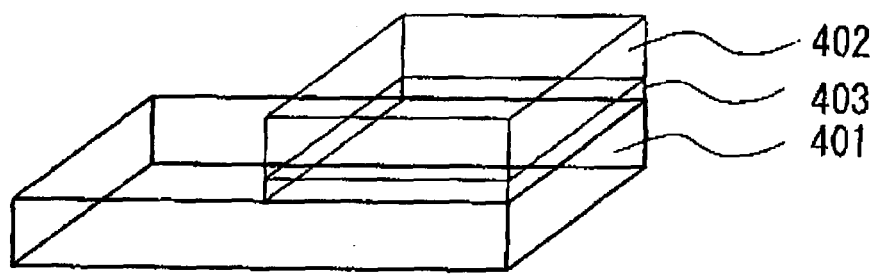
FIG. 4(B) is an explanatory drawing of another method of magnetization pinning of a first ferromagnetic layer of the present invention.

The antiferromagnetic layer is disposed on a first ferromagnetic layer 401 so as to cover the whole as shown in FIG. 4(A) or so as to cover only a joined surface (for example, the area 204 of FIG. 2). Although a structure in which an NiFe-based or Co-based soft magnetic metal film 403 having a thickness of 1 to 5 nm or so is interposed between the first magnetic layer 401 and an antiferromagnetic film 402 is particularly effective, a structure having no such a soft magnetic metal film is also effective. Films which constitute this antiferromagnetic film 402, such as PtMn, CrMnPt, MnIr, NiO and PdPtMn, have a thickness of several nanometers to tends of nanometers, which exceed a threshold thickness specified for each composition, greatly exhibit unidirectional anisotropy when subjected to thermal annealing under magnetic field under appropriate conditions, and are effective in pinning the magnetization of the first ferromagnetic film 401.

Furthermore, by applying materials of high spin polarizability, such as half-metal, to magnetic layers, it is possible to increase the polarizability of spin polarized currents and thereby to further enhance the magnetic interaction. The half-metal here refers to a substance in which the electron structure at the Fermi level of the material is substantially 100% constituted by only either of the top and bottom spins. The polarizability P refers to the bias of this spin and is defined by the following mathematical formula (1) in which the electron number of the upward spin is denoted by n↑ and the electron number of the downward spin is denoted by n↓.

$$P = 100 \times (n\uparrow - n\downarrow)/(n\uparrow + n\downarrow) \quad \text{(Formula 1)}$$

When electrons are caused to flow through half-metal, the electrons of the same spin component as in the direction of the electron spin at the Fermi level of the half-metal are retained and transmit through the half-metal, whereas electrons whose spin is reversed cannot transmit because of the action of a force of repulsion.

When the layer 201 formed from half-metal is put into at least either of the ferromagnetic layers in the magnetic sensor shown in FIG. 1 or FIG. 2, electrons which pass through the half-metal layer 201 come to a state of very high spin polarizability. In the case of an ideal half-metal, the electron state at the Fermi level is that of almost 100% spin polarization and, therefore, a current which flows through this half-metal obtains a spin polarizability of nearly 100%. The polarizability of actually known half-metal at room temperature is in the range of 50% to 90%. This is because the resistance of half-metal to a current having reversed spin components is almost infinite, electrons of reversed spin are scattered and only the spin on one side transmits while keeping a long spin diffusion length.

If such a highly spin polarized current is effectively introduced from the above-described ferromagnetic layer into a conductor, the polarizability of spin electrons accumulating in the conductor increases and the magnetic interaction becomes strong, with the result that the magnitude of the voltage change ΔV which depends on a magnetic field generated on the free layer side becomes very large.

A half-metal film often has higher electrical resistance than a metal film and when the application of a usual device to high recording density design is considered, in many cases it becomes difficult to lower the resistance. However, in the present invention, a structure which obtains an output as a sensor is provided in a portion different from that of a magnetoresistive structure and, therefore, the advantage from the standpoint of material selection that the application design of half-metal can be easily performed is also conceivable.

Such half-metal magnetic layer materials are broadly classified into (A) magnetic semiconductors and (B) part of magnetic oxides. (A) Magnetic semiconductors are diluted magnetic semiconductors (InMnAs, GaMnAs) in which magnetic substances such as Mn are doped to semiconductors of compounds having a zinc-blend type crystal structure, such as CrAs and CrSb, and Groups III to V compounds having a similar crystal structure, and the like. These semiconductors are fabricated by the epitaxy method for single crystal by MBE.

In general, it is in a low-temperature region of 100 K to not more than 4 K that these magnetic semiconductors exhibit their properties like those of half-metal. However, exceptionally some magnetic semiconductors exhibit their properties even at high temperatures, as in the case of CrSb (up to 350 K) and CrAs (Tc>1000 K). In CrAs, which has a zinc-blend type crystal structure, Tc is very high as described above according to calculations by the first principle and also experimentally, ferromagnetic and half-metallic properties have been verified at room temperature for a film with a film thickness of about 1 nm. Some of the magnetic semiconductors in which a transition metal element is doped to ZnO and GaN and other magnetic semiconductors having zinc-blend type crystal structure exhibit ferromagnetic behavior at room temperature and are regarded as half-metal.

On the other hand, $Fe_3O_4$ is known especially well as a magnetic oxide of (B). In addition, $CrO_2$ is a candidate for a half-metal material. $Fe_3O_4$ is important because the half-metallic properties are obtained at room temperature and because as a magnetic substance magnetization is large and soft magnetic properties are obtained. In general, however, high-temperature treatment at a temperature exceeding 500° C. or film fabrication at a substrate temperature is necessary for obtaining a single-layer film and, therefore, these magnetic oxides have not yet been put to practical use.

Oxide half-metal materials have the big problem of fabrication temperature as described above and generally, the stage of device fabrication or of the fabrication of actual magnetic heads has not yet been reached. Furthermore, in the case of $Fe_3O_4$, there is a phase called $Fe_2O_3$ which is not half-metal and whose composition is close to that of $Fe_3O_4$. $Fe_2O_3$ has low magnetization although it is a stable phase. This phase is apt to become a mixed phase and tends to form a mixed phase also with Fe and $Fe_3O_4$. Because $CrO_2$ is also apt to become a mixed phase with an insulator called $Cr_2O_3$, a special fabrication method, for example, high-temperature fabrication in an oxygen atmosphere is necessary.

With respect to this problem, it is possible to adjust the growth energy by selecting a substrate material for $Fe_3O_4$ thereby to form a single layer. As such materials, part of the noble metals, such as Pt, Rh and Cu, TiN as a compound and the like are effective. By using a method which involves forming a film of these substances on a substrate by the RF sputtering method and forming $Fe_3O_4$ on this film, it is possible to fabricate a half-metal magnetic layer.

When film fabrication is performed at a substrate temperature of 300° C. by this method, it has been ascertained from the measurement of an X-ray diffraction pattern that the fabricated film is a single layer of $Fe_3O_4$ and it has been ascertained from measurements using a VSM (vibrating sample magnetometer) that the saturation magnetization at room temperature is 0.55 to 0.6 tesla, which range is equal to that of the bulk $Fe_3O_4$ (saturation magnetization: 0.5 to 0.6 tesla at room temperature). Furthermore, an abnormality in the temperature dependence of saturation magnetization near 120 K, which is a characteristic of $Fe_3O_4$, (the Verwey transition temperature) has also been capable of being verified by an electric resistance measurement of a single-layer film. The same applies also to film fabrication at a substrate temperature of not less than 250° C. Therefore, it is supposed that the formation of an $Fe_3O_4$ single-layer film can be performed by this method. Furthermore, thin film design of several nanometers is also possible.

Accordingly, the above-described half-metals are at least one kind of oxides having the structure of $AB_2O_4$ represented by the half-metal $Fe_3O_4$ in which A is at least one kind selected from the group consisting of Fe, Co and Zn and B is an oxide containing one kind selected from the group consisting of Fe, Co, Ni, Mn and Zn, compounds in which at least one kind selected from the group consisting of the transition metal elements Fe, Co, Ni, Cr and Mn is added to $CrO_2$, CrAs, CrSb or ZnO, compounds in which Mn is added to GaN, and Heusler alloys of $C_2D_xE_{1-x}F$ type represented by $Co_2MnGe$, $Co_2MnSb$, $Co_2Cr_{0.6}Fe_{0.4}Al$ and the like in which C is one kind selected from the group consisting of Co, Cu and Ni, D and E are each one kind selected from the group consisting of Mn, Fe and Cr, and F is at least one kind selected from the group consisting of Al, Sb, Ge, Si, Ga and Sn.

A single-layer film using $Al_2O_3$, AlN, $SiO_2$, $HfO_2$, $Zr_2O_3$, $Cr_2O_3$, MgO, $TiO_2$ and $SrTiO_3$, which are materials for the insulating barrier layer used in TMR, or a single film or a laminated film which is formed from a film containing at lest one kind of these materials is applied to the intermediate layers 103, 105 of FIG. 1. This is because the electron conduction by the tunneling effect is low in spin information loss and it is easy to obtain an output of voltage change.

Because the conductor 101 is an electrode and is required to have low resistance and nonmagnetic properties, it is effective to use nonmagnetic conductive metals of Cu, Au, Ag, Pt, Al, Pd, Ru, Ir and Rh or conductive compound such as GaAs and Si. Furthermore, it is thought that compounds of d electron conduction whose main components are TiN, TiO and $ReO_3$ having a d electron, which is a magnetic electron, at the Fermi level are especially effective, because the losing of spin information ascribed by the energy transition from a d electron to an s electron is prevented.

Figure 5:
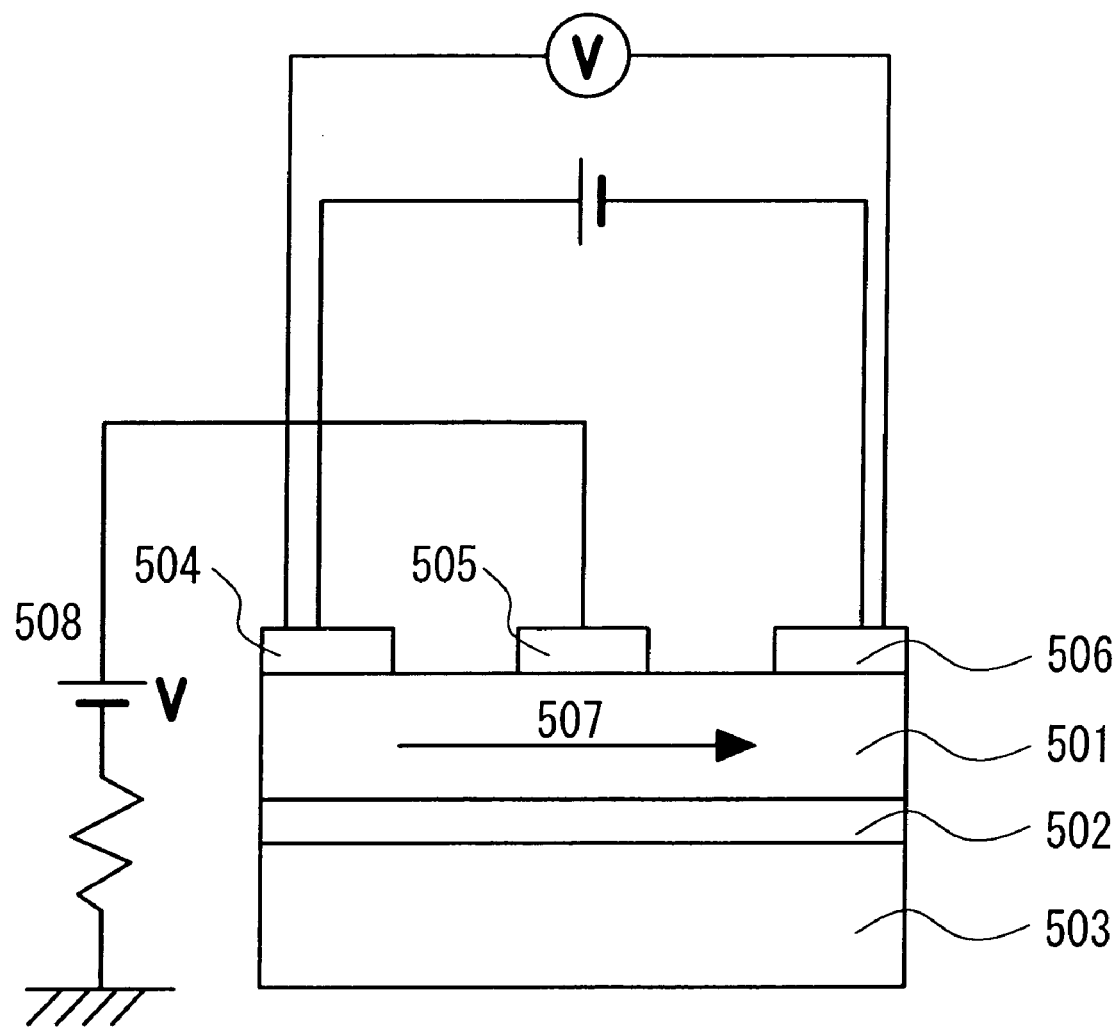
FIG. 5 is an explanatory drawing of the basic structure of a magnetoresistive amplifier mechanism of the present invention.

Next, the operation and structure of the voltage change amplifier film 106 will be described below. FIG. 5 is a view of a device of the invention, which shows the basic operation of the voltage change amplifier film. A film 501 formed from materials constituting the voltage change amplifier film is disposed on a substrate 503 via an appropriate buffer layer 502, and provided with electrodes 504, 505, 506. A constant current 507 flows from the electrode 504 toward the electrode 506 through the film and similarly the electrode 504 and the electrode 506 are wired to permit the measurement of voltage changes. A mechanism 508 which applies a voltage to the electrode 505 is provided.

Figure 6:
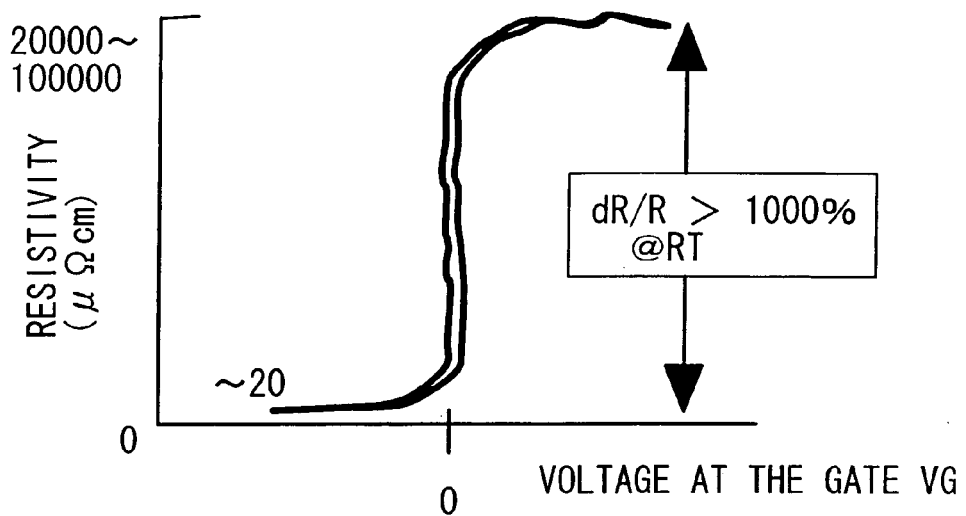
FIG. 6 is a chart showing the relationship between voltage and resistivity of a magnetoresistive amplifier mechanism of the present invention.

The electrical resistance RSD across the electrode 504 and the electrode 506 changes as shown in FIG. 6 depending on the polarity of a voltage VG applied to the electrode 505. When the material constituting the film 501 has the composition of $Pr_{0.7}Ca_{0.3}MnO_3$, for example, the magnetoresistive ratio respective to a minimum value of RSD exceeds 1700%. Materials having such properties are YBaCuO-based materials, and materials of Perovskite structure having the composition of $RBMnO_3$ (R: rare earth element, B: alkaline element), such as $LaCaMnO_3$- and $LaBaMnO_3$- materials). Although these materials are known as materials having superconductivity and as materials having a great CMR (colossal MR) characteristic as ferromagnetic substances, it is also known that the properties of these materials change diversely depending on their compositions. The compositions used in the present invention have compositions different from those of these materials.

Although the compositions are diverse depending on materials, the materials for the compositions used in the present invention are paramagnetic materials in terms of magnetic properties. The above-described resistance change is a sufficiently larger value at room temperature and it has been ascertained in a voltage pulse application experiment that changes, such as a deterioration in resistance value by repeated pulse application, are not apt occur. The materials can be easily fabricated by relatively easy fabrication techniques such as spreading. It might be thought that carrier electrons which are enhanced by an electric field to the Fermi energy level of the materials are doped to increase conductivity, thereby serving an important function in this phenomenon and that the application of a voltage or an electric field to the film in the form of a device causes a desired resistance change.

That is, if an electrode generating a signal of voltage changing due to the magnetoresistive device which utilizes the above-described accumulation effect of spin currents is brought into contact with the electrode 505 of this film so that an electric field is applied to the resistance change amplifier film 106 in terms of a circuit, it is possible to fabricate a sensor and a reading magnetic head whose resistance changes greatly due to a change in a magnetic field.

Figure 7:
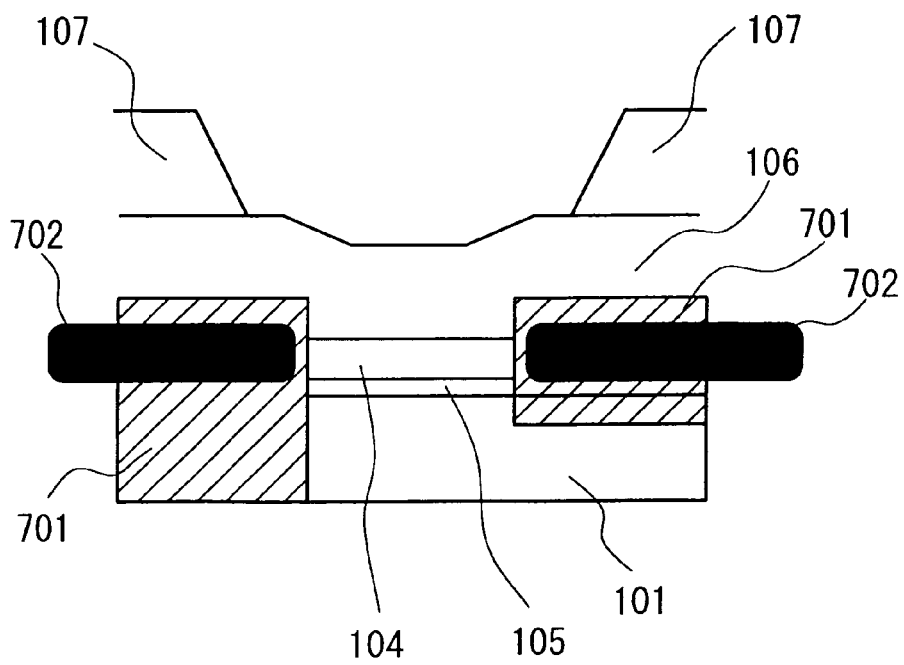
FIG. 7 is a sectional view of an area near a second ferromagnetic layer of the present invention, which is provided with a magnetic domain controlling mechanism of the hard biasing method.

For a magnetic domain controlling technique of the free layer 104, in a case where as shown in FIG. 7, the use of the hard biasing method applied to a general GMR reading head is considered, by disposing permanent magnets 702 at both ends of the device film 104 in the track width direction thereof via an insulator film 701, it is possible to reduce the number of fine magnetic domains generated at the ends of the free layer 104 in the device by using leak fields from the permanent magnets 702, thereby to form a magnetic domain structure which is aligned in one direction.

Figure 8:
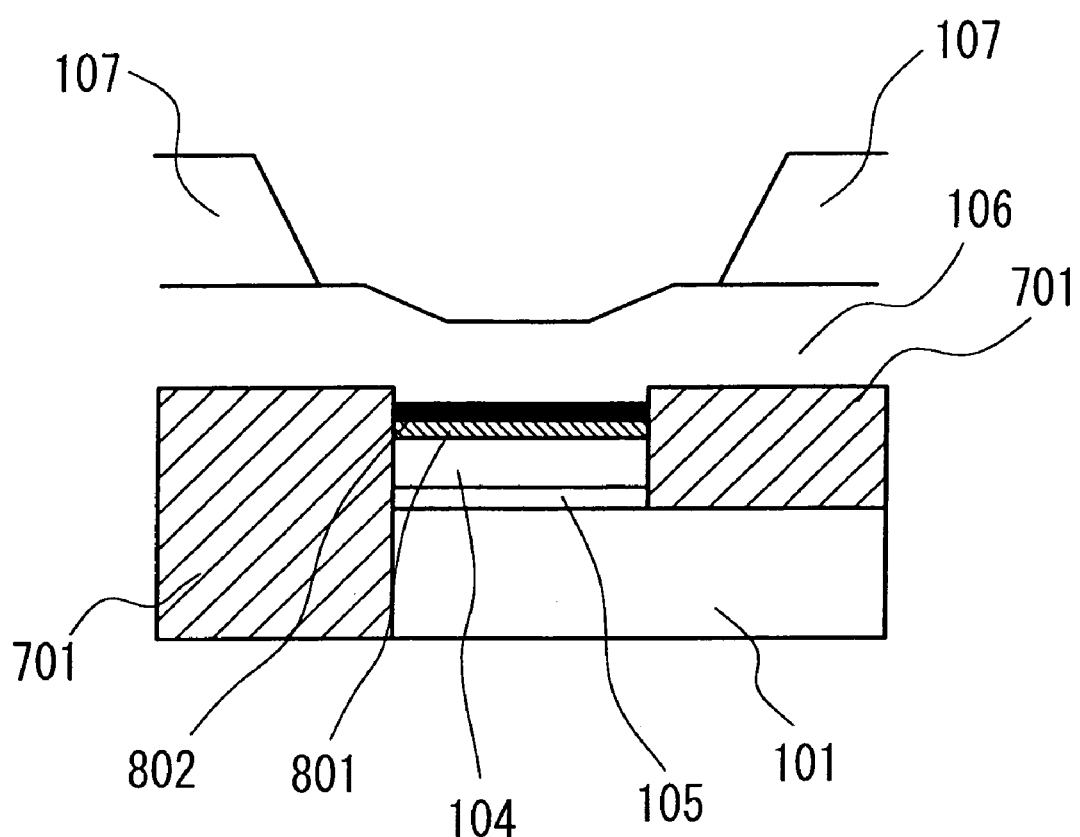
FIG. 8 is a sectional view of an area near a second ferromagnetic layer of the present invention, which is provided with a magnetic domain controlling mechanism of the CFS method.

Furthermore, as a new magnetic domain controlling method, as shown in FIG. 8, a permanent magnet 802 is provided on the other main face side of the free layer 104 or free layer 103 and the intermediate layer 106 in contact therewith via a nonmagnetic film 801. In addition, as the structure of the film of the permanent magnet 802, it is effective to employ a method which involves forming a multilayer film formed from soft magnetic films in contact with the antiferromagnetic film, thereby to align magnetic domains of the free layer 104 by using leak fields generated from this permanent magnet or the ends of a soft magnetic film 802 (the CFS (closed flux structure) method).

When the device size is in the range of not more than 1 μm×1 μm, it is expected that the insulating properties of the insulator film and the accuracy of magnetic domain controlling magnetic fields of the above-described hard biasing method deteriorate greatly. Although thin film design poses a problem in an area where the read gap distance is below 50 nm, this method is promising as a future method and sufficiently effective also for the film structure of the present invention.

The present invention will be described below on the basis of concrete embodiments.

EMBODIMENT 1

A film was formed on a usually used substrate such as an $SiO_2$ substrate and a glass substrate (including a magnesium oxide substrate, a GaAs substrate, an AlTiC substrate, an SiC substrate, an $Al_2O_3$ substrate and the like) by use of a film fabrication apparatus of the RF (radio frequency) sputtering method, the DC sputtering method, the molecular beam epitaxy (MBE) method and the like. For example, in the case of the RF sputtering method, in an apparatus using a 3-inch φ target, a prescribed film was caused to grow in an Ar gas atmosphere, at a pressure of about 1 to 0.05 Pa, with a power of 50 W to 150 W. The above-described substrates are directly used or those obtained by forming an insulator film, an appropriate buffer metal layer and the like on these substrates are used as substrates on which the device is to be formed.

A Cu film was formed on the substrate on which the device is to be formed in a high vacuum in a film thickness of 50 nm, an Al film was then formed on this Cu film in a film thickness of 1 nm, and the substrate was naturally oxidized in an oxygen atmosphere. In the oxidation of the Al film, the oxidation processes such as plasma oxidation and ozone oxidation may be used in stead of natural oxidation. After the oxidation treatment, a Co film was formed on this Al film in a film thickness of 10 nm. In some cases, a Ta film and the like were formed on this Co film as a protective film. A resist was applied to this film and an electrode shape 101 as shown in FIG. 9 was drawn by lithography using an i-line beam stepper.

Because an i-line beam stepper has its limitations in a case where the size of fine wires is small, the shapes were drawn by an electron beam drawing method. This film was subjected to milling treatment by use of an Ar ion milling apparatus and a pattern was formed. After that, the joint portions 103, 104, 105 are drawn and the joint portions are formed. In this connection, insulating films 901, 701 of $Al_2O_3$ and $SiO_2$ were formed in surrounding areas in a lift-off pattern by use of a two-stage resist and the like and lift off was then performed.

In the fabrication of the device, the electron beam drawing method, the stepper method or the probe drawing method was used. Furthermore, treatment to remove burrs occurring after ion milling or dry etching was carried out. In forming the hard biasing film of the free layer, a film of CoCrPtZr and the like which is a permanent magnet was formed after the formation of the insulating film and a further insulating film was formed. After that, drawing for forming the Co wire 102 was performed and a soft magnetic film of Co and NiFe etc. and an antiferromagnetic film of MnIr and the like were formed on the Co wire 102 subjected to surface cleaning.

The resistance change amplifier film 106 was formed on this film by spreading or deposition drawing treatment was performed so as to form a joint on this free layer 104, whereby a pattern was formed, and electrodes were formed at both ends of this pattern. The electrodes are formed by either the two-probe method or the four-probe method.

EMBODIMENT 2

Figure 9A:
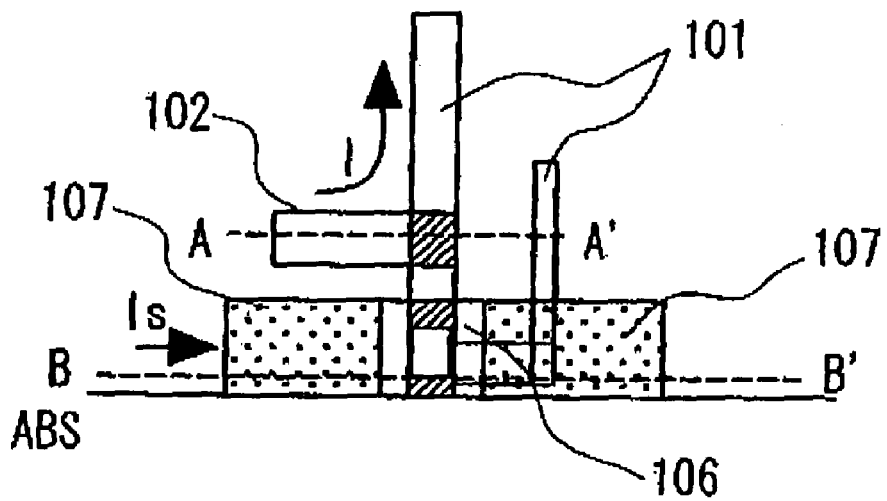
FIG. 9(A) is a top view of a device structure according to an embodiment of the present invention.
Figure 9B:
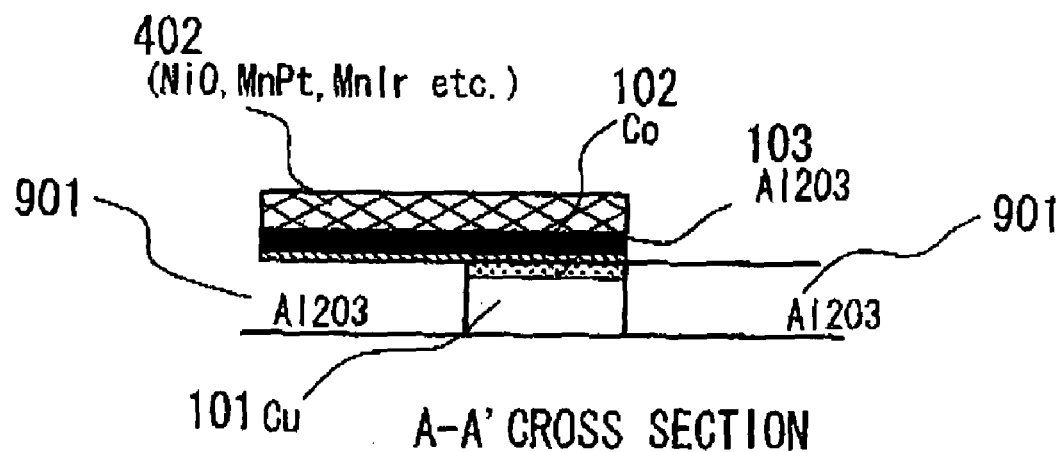
FIG. 9(B) is a cross sectional view of the device structure taken along the line A-A' of FIG. 9(A)
Figure 9C:
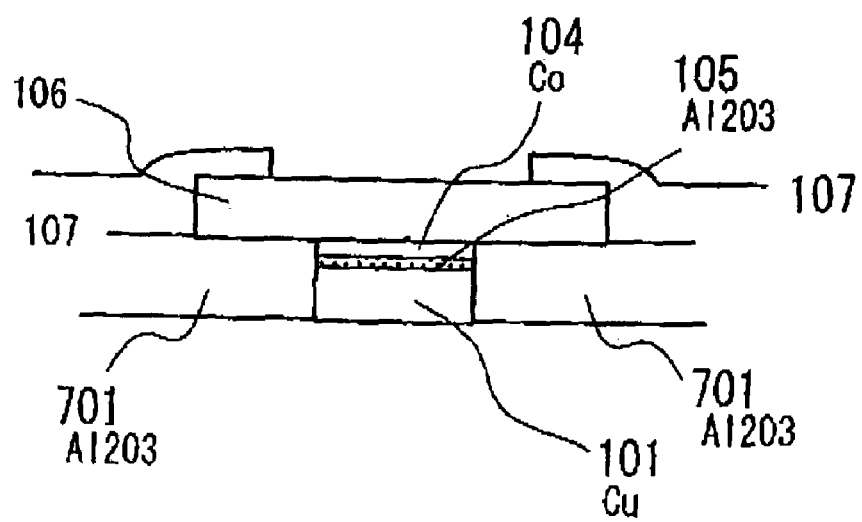
FIG. 9(C) is a cross sectional view of the device structure taken along the line B-B' of FIG. 9(A)

FIG. 9(A) shows an actually fabricated device of the structure shown in FIG. 1 as viewed from above. The linear conductor 101 of Cu having a width of 0.1 to 10 nm or so and the first conductor 102 are in contact with each other at the first intermediate layer 103 of $Al_2O_3$ formed on the conductors and the second magnetic layer 104 is contact with the conductor 101 via the intermediate layer 105 in a position 10 to 1000 mm distant from the conductor 101. This second magnetic layer 104 is in contact with the voltage change amplifier film 106 formed from $Pr_{0.7}Ca_{0.3}MnO_3$ and the electrodes 107 of Au are disposed at both ends of the voltage change amplifier film 106.

A current source is connected to the first magnetic layer 102 and the conductor 101 so that a current is caused to flow from the direction 109 to the direction 110. An end of the conductor which extends in the direction 112 is electrically grounded.

The voltage change amplifier film 106 has a mechanism of causing a current for detecting output signals via the electrodes 107 to flow, for example, in the direction 108. Although the electrodes 107 are described as the two-probe method in terms of a circuit, a circuit configuration for measurement made by use of the two-probe method was adopted as a circuit configuration.

Figure 10:
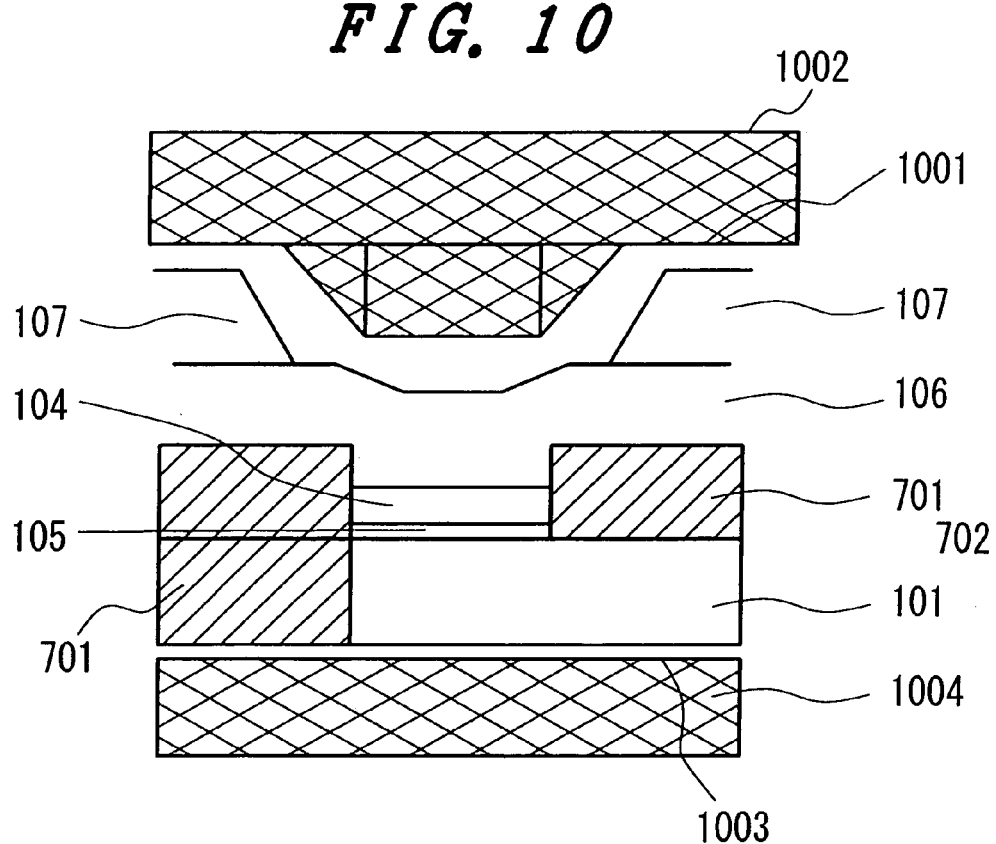
FIG. 10 is a sectional view of a reading head structure provided with top and bottom magnetic shields.

FIG. 10 shows a structure in which magnetic shields 1002, 1004 by soft magnetic films are disposed, via insulating films 1001, 1003, on the front surface side of the lower layers forming the substrates of these devices and of the films 107, 106 which form the resistance change amplifier mechanism.

Furthermore, it is possible to increase the final output by bringing an electrically grounded film into contact with the other main face side of the voltage change amplifier film 106 directly or via a high-resistance film. As this method it is also effective to connect the top surface of this voltage change amplifier film 106 to a grounded shield. The magnetic head is formed to provide s structure in which the recording head is positioned on this top shield 1002.

When the area of the device 104 is 1 nm×1 nm, the voltage change V which occurs in the free layer portion 104 of this magnetoresistive sensor according to the direction of a magnetic field is experimentally 10 mV when the current 108 is 1.0 mA, and this voltage can drive the resistance change amplifier film 106.

It is possible to raise this voltage by shrinking the device area, increasing the current, making a material selection, such as the use of a material having a high spin polarizability in a magnetic film, lowering the temperature and the like. This voltage change is characterized by polarity changes to the positive and negative sides. At this time, in order to ensure that an electric filed and a voltage are applied to the voltage change amplifier film, it is important to ground the voltage of the electrode 101 at the end opposite to the current circuit.

The voltage change amplifier film changes resistance values according to a change in the polarity of the voltage applied. In the case of $Pr_{0.7}Ca_{0.3}MnO_3$, the resistivity changes greatly from 20 μΩcm to approximately 100000 μΩcm. Therefore, when resistance is measured by causing a constant sensing current to flow through a film formed from this material, the resistance changes greatly as a result of magnetic field sensing by a magnetic sensor. Hence it is possible to amplify a magnetoresistive ratio which has hitherto been very small 1000 times or so. For example, if this voltage change amplifier film is 2 μm wide and 5 μm long and has a film thickness of 20 nm, the resistance changes from 25 Ω to 25000 Ω.

Therefore, if the sensing current is 1 mA, it follows that by simple arithmetic, signal changes of 25 mV to 250 V occur. The value of device resistance can be adjusted by film thickness and device size. Furthermore, this voltage change amplifier film has magnetic properties ranging from those of a nonmagnetic material to those of a paramagnetic material and hence an adverse magnetic effect on the free layer in contact with the resistance change amplifier film can be neglected. Design is easy because the magnetic resolution can be determined by the size of the magnetic free layer and this resistance change amplifier film is not so much limited by size and shape as the free layer portion.

EMBODIMENT 3

In addition to the structure described above, it is possible to form a sensor structure by using a similar mechanism.

Figure 11:
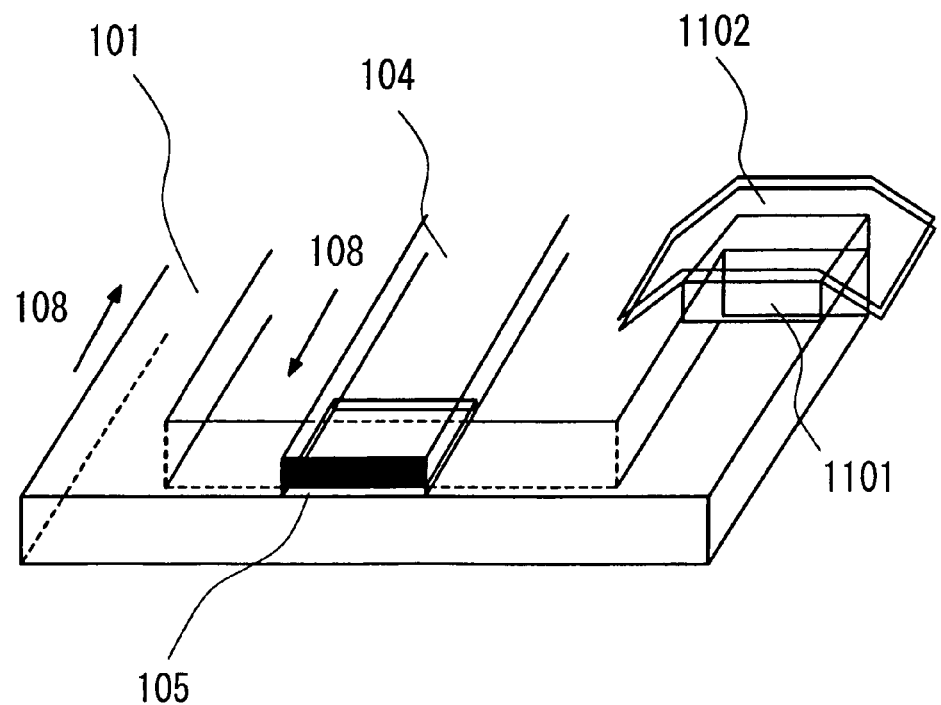
FIG. 11 is a schematic view showing Example 1 of the structure of a magnetic reading head device of the present invention other than that of FIG. 1.

FIG. 11 shows a similar structure which performs a similar function. The materials etc. of each member of the structure are correlated by using the above-described reference numerals. In this sensor mechanism, a current is caused to flow in the direction of the arrow 108, a second magnetic layer 104 is in contact with a nonmagnetic conductive film 101 via an insulating layer 105, a first magnetic layer pinned by an antiferromagnetic layer has a contact portion 1101 which is in contact with the nonmagnetic conductive film 101 via an insulating film, and a resistance change amplifier film 1102 which is in contact with the contact portion 1101 and has the function of measuring resistance while causing a current to flow is provided.

Figure 12:
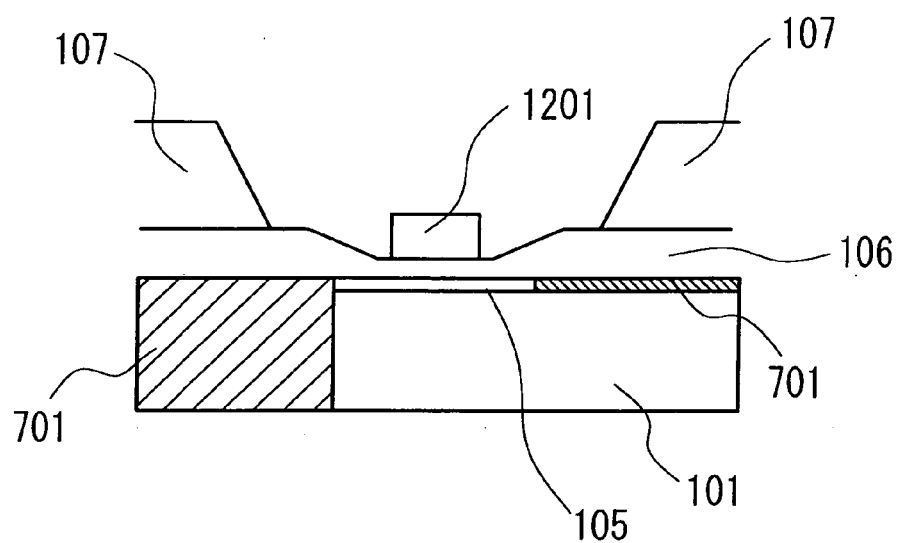
FIG. 12 is a schematic view showing Example 2 of the structure of a magnetic reading head device of the present invention other than that of FIG. 1.

Furthermore, as shown in FIG. 12, for the positional relationship between an output generation mechanism of changes in magnetoresistance (for example, that shown in FIG. 1) and a resistance change amplifier film, it is possible to obtain a similar output from a form in which a resistance change amplifier film 106 is sandwiched between a magnetic layer 1201 and an insulating barrier film 105.

It is possible to obtain a similar output whether this magnetic layer 1201 is provided with an antiferromagnetic exchange film which forms a pinned layer 102 or a magnetic domain controlling structure such as a free layer 104.

EMBODIMENT 4

In the formation of $Fe_3O_4$ as these magnetic films, by using a new fabrication method which involves lowering the $H_2O$ percentage of the sputtering chamber atmosphere and forming a film at a low rate and with low energy, $Fe_3O_4$ films having a film thickness of not more than 50 nm and saturation magnetization of not less than 0.4 tesla could be formed at a substrate temperature of not less than 250° C. It has been known from theoretical verifications based on the first principle, past spectroscopic analyses and the like that this $Fe_3O_4$ has half-metallic properties.

Whether the buffer films are formed from conductive metals such as Pt, Cu, Pd, Rh, Ru, Ir, Au, Ag, Ta, CoFe, Co and NiFe, alloy films or conductive compound films of TiN etc., the saturation magnetization Bs of formed $Fe_3O_4$ films became not less than 0.4 tesla by ensuring the surface roughness of these buffer films of not more than 0.4 nm and almost satisfactory $Fe_3O_4$ growth was verified. By inserting appropriate buffer films of Cr, Ta, NiFeCr, etc. in thicknesses of several nanometers to tends of nanometers under these noble metals, the surface structure of noble metal films which grow on these buffer films become smooth and the growth of the $Fe_3O_4$ films is promoted.

Also for $CrO_2$, ZnO and GaN, which are oxide half-metal materials other than $Fe_3O_4$, it was ascertained that single-layer films are formed even at a substrate temperature of 250° C. by forming buffer metal films as with the above-described case of $Fe_3O_4$ and causing $CrO_2$, ZnO and GaN films to grow on the buffer metal films. When ferromagnetic metals of V, Cr, Fe, Co and Ni are doped about 25%, ZnO comes into a state of ferromagnetic half-metal. Also GaN becomes ferromagnetic half-metal when Mn is doped 25% on a buffer film of GaAs by use of MBE.

In the case of $Co_2MnGe$, $Co_2MnSb$ and $Co_2Cr_{0.6}Al_{10.4}Mn$, which are compounds called Heusler alloys, a film can be fabricated by causing a target corresponding to a composition to grow directly on a substrate by the RF sputtering in an Ar gas atmosphere. The substrate temperature is not less than 300° C. and it is desirable to apply 700° C. or higher heat treatment to the film. However, it is possible to obtain an ordered structure also in a case where a film is formed on a substrate at room temperature and subjected to heat treatment at 270° C. for a long time. Because the composition of a fabricated film is apt to deviate from the composition of a target, it is necessary to check the composition of the fabricated film by making an identification by use of XPS or an ICP analysis.

By using these films in the magnetic layers, the output $\Delta V$ as a magnetoresistive device increases to several times, being effective in simplifying device design.

EMBODIMENT 5

Figure 13:
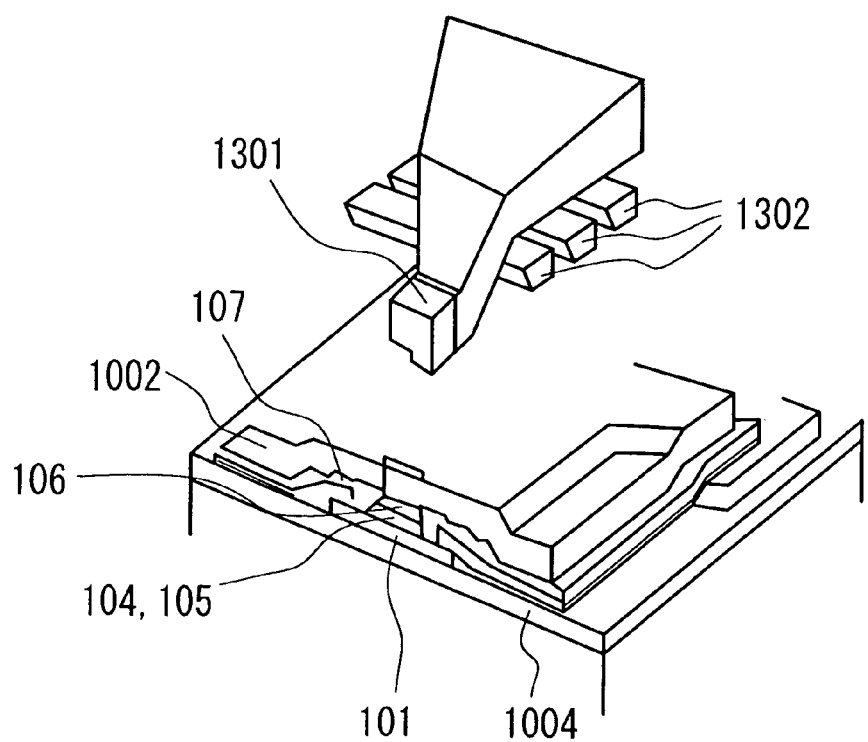
FIG. 13 is a schematic view showing the positional relationship between a magnetoresistive device and a reading head to which the present invention is applied.

FIG. 13 is a schematic illustration showing a magnetic reading head including a recording head. The above-described reading head mechanism is disposed between the upper and lower shields 1002, 1004, and on the ABS (air bearing surface) opposed to the medium are disposed the magnetic film 104 and the conductor 101.

As shown in this figure, a magnetic pole 1301 and coils 1302 which induce magnetization are disposed in the device thickness direction. CoFe-based materials having high saturation magnetic flux density are used as the materials for a conventional type of magnetic pole. Although in recent years a recording method based on the use of materials having higher saturation magnetic flux density than CoFe-based materials has been pushed forward with, the reading method of the present invention is effective in perpendicular magnetic recording and internal magnetic recording, which are realized by using such materials.

These reading methods are effective also in a recording head provided with a mechanism of performing magnetization reversing by irradiating a medium with size-reduced light thereby to locally raise the medium temperature and using the action of magnetization reduction resulting from a temperature rise of the medium.

Figure 14:
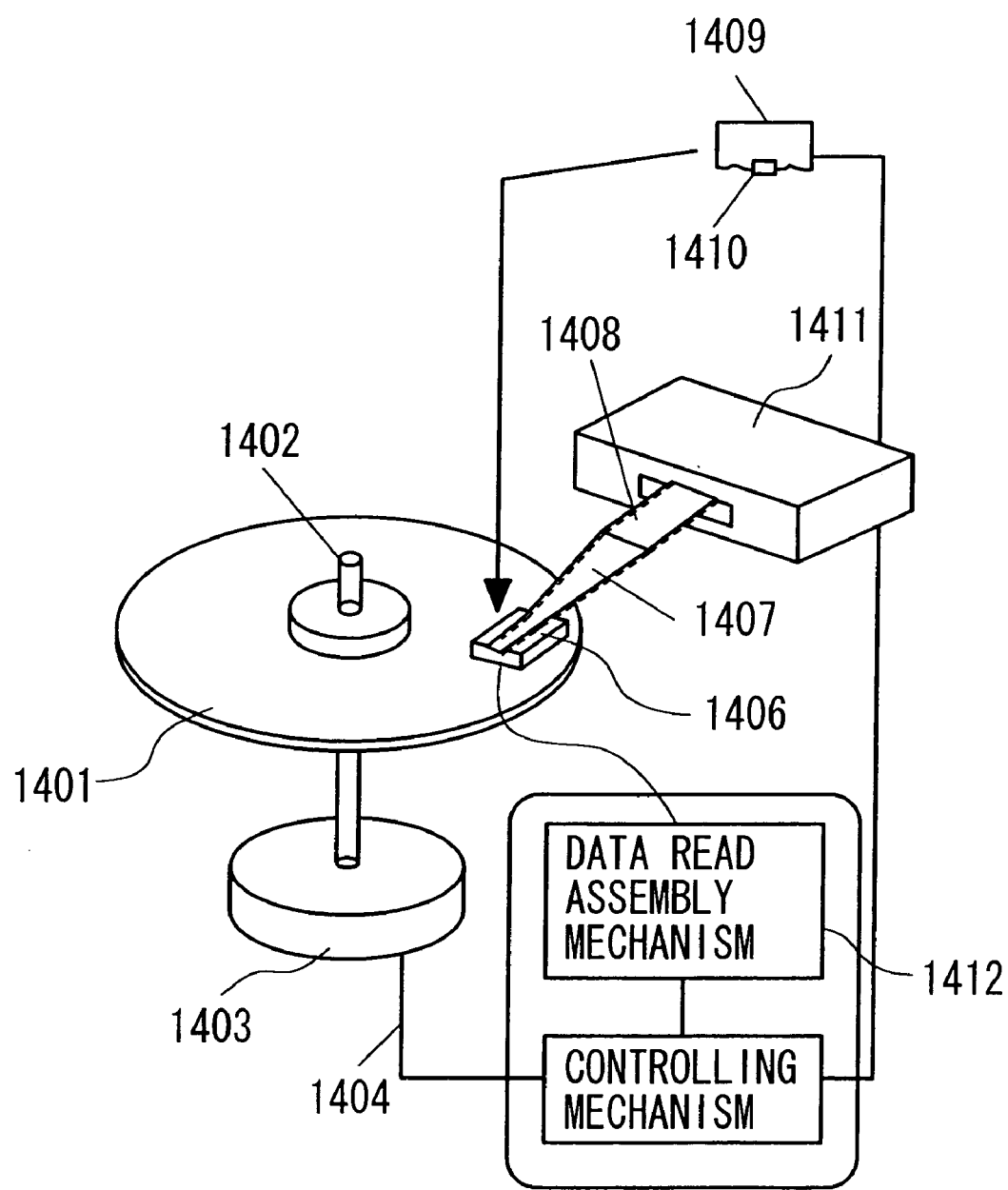
FIG. 14 is a schematic view of a magnetic reading apparatus to which the present invention is applied.

FIG. 14 shows a recording disc device of an embodiment which uses a head of the present invention. The illustrated recording disc device comprises a recording disc 1401 to record data in a concentric recording area called a track as a magnetic recording medium formed in disc shape and a magnetic transducer and includes a magnetic head 1406 of the present invention to perform the reading and writing of the above-described data, an actuator 1411 which supports the magnetic head 1406 and moves the magnetic head 1406 to a prescribed position on the recording disc 1401, and a controlling mechanism which controls the sending and receiving of data read and written by the magnetic head and the movement of the actuator and the like.

The construction and operation of this recording disc device will be described. At least one rotatable recording disc 1401 is supported by a rotary shaft 1402 and rotated by a motor 1403. At least one slider 1406 is provided on the recording disc 1401. The slider 1409, whose number is one or more, supports a magnetic head 1410 of the present invention to perform reading and writing.

At the same time of the rotation of the recording disk 1401, the slider 1406 moves on the disc surface, whereby the slider 1406 is given access to a predetermined position where object data is recorded. The slider 1406 is mounted on an arm 1408 by use of a suspension 1407. The suspension 1407, which has slight elasticity, causes the slider 1406 to adhere closely to the recording disc 1401. The arm 1408 is attached to the actuator 1411.

A voice coil motor (hereinafter referred to as "VCM") can be used as the actuator 1411.

The VCM comprises a movable coil placed in a pinned magnetic field and the moving direction, moving speed, etc. of the coil are controlled by electrical signals given via a line 1404 from the controlling mechanism 1412. Therefore, the actuator of this embodiment includes, for example, the slider 1406, the suspension 1407, the arm 1408, the actuator 1411 and the line 1404.

During the operation of the recording disc, an air bearing by air flow is generated between the slider 1406 and the disc surface by the rotation of the recording disc 1401, and this air bearing causes the slider to float from the surface of the recording disc 1401. Therefore, during the operation of the recording disc device, this air bearing keeps balance with the slight elastic force of the suspension 1407 in such a manner that the slider 1406 is maintained so as to float without coming into contact with the recording disc surface while maintaining a constant gap with the recording disc 1401.

Usually, the control mechanism 1412 sends and receives control signals through each line and controls various components of the recording disc device. For example, the motor 1403 is controlled by motor driving signals transmitted through the line 1404.

The actuator 1411 is controlled so as to optimally move and position the slider 1406, which has been selected to a target data track on the related recording disc 1401 by head position control signals, seek control signals, etc. via the line 1404.

And the control mechanism receives and decodes electrical signals, which have been produced by the magnetic head 1410 by reading and converting the data of the recording disc 1401, via the line 1404. Furthermore, the control mechanism sends electrical signals to be written in the recording disc 1401 as data to the magnetic head 1410 via the line 1404. That is, the control mechanism 1412 controls the sending and receiving of information which the magnetic head 1410 reads or writes.

Incidentally, the above-described read and write signals can also be transmitted directly from the magnetic head 1410. As control signals there are available, for example, access control signals and clock signals. Furthermore, the recording disc device may have multiple recording discs, actuators, etc. and these actuators may each have multiple magnetic heads. For the type of the medium, a mechanism in which a large number of heads perform concurrent scanning on a fixed medium is also effective in addition to a type in which as shown in the figure a disc-shaped medium rotates and a head performs access.

By providing multiple such mechanisms at the same time, it is possible to form what is called a disc array device.

By mounting a magnetoresistive device of the present invention on this magnetic recording device, it becomes possible to perform magnetic recording/reading in a region in which the reading density exceeds 500 Gb/in.$^2$.

As will be understood from the above descriptions, a magnetic sensor and a magnetic head related to the present invention permit easier adjustment of device resistance than conventional magnetoresistance change type magnetic reading heads, have a very high magnetoresistive ratio, are effective in high resolution design and yield large output. A magnetic recording device provided with this magnetoresistive device can be used in combination with a magnetic recording medium having a surface recording density exceeding 500 (Gb/in.$^2$).

What is claimed is:

1. A magnetic sensor comprising:
    a first ferromagnetic film;
    a conductor intersecting the first ferromagnetic film via a first intermediate layer;
    a current circuit structure connected so as to cause a current to flow from the first ferromagnetic layer to the conductor;
    a second ferromagnetic film formed on the conductor in an intersecting manner via a second intermediate layer and which generates a signal of changing voltage by a change in an external magnetic field;
    a voltage change amplifier film which converts the signal of changing voltage to a change in electrical resistance and amplifies the signal intensity of the change in electrical resistance, and which contains materials whose resistance changes nonlinearly due to voltage; and
    an electrode connected to the voltage change amplifier film.

2. The magnetic sensor according to claim 1, wherein the electrode causes a current to flow to the voltage change amplifier film.

3. The magnetic sensor according to claim 1, wherein the conductor has a shape which is elongated in a direction substantially opposite to a current direction in the current circuit.

4. The magnetic sensor according to claim 1, wherein the resistance change amplifier film is formed on the side of a surface not in contact with the second magnetic film.

5. The magnetic sensor according to claim 1, wherein the first ferromagnetic film, in all thereof or at least in a portion where the first ferromagnetic film is in contact with the conductor, is formed from a material having a larger coercive force than in the second ferromagnetic film or is a structure having a larger coercive force due to a difference in film thickness and shape even with the same material.

6. The magnetic sensor according to claim 1, wherein the direction of magnetization of the first ferromagnetic film is pinned by a film formed from an antiferromagnetic material.

7. The magnetic sensor according to claim 1, wherein the voltage change amplifier film contains a material of Perovskite structure having a composition consisting of $RBMnO_3$ (R: rare earth element, B: alkaline element) at room temperature.

8. In a magnetic head having a reader device, the reader device comprising:
    a first ferromagnetic film,
    a conductor which intersects the first ferromagnetic film via a first intermediate layer,
    a current circuit structure connected so as to cause a current to flow from the first ferromagnetic layer to the conductor,
    a second ferromagnetic film formed on the conductor in an intersecting manner via a second intermediate layer and which generates a signal of changing voltage according to a change in an external magnetic field,
    a voltage change amplifier film which converts the signal of changing voltage to a change in electrical resistance and amplifies the signal intensity of the change in electrical resistance, and
    an electrode connected to the voltage change amplifier film, wherein the voltage change amplifier film contains materials whose resistance changes nonlinearly due to voltage.

* * * * *